(12) United States Patent
Koyama et al.

(10) Patent No.: US 9,242,890 B2
(45) Date of Patent: *Jan. 26, 2016

(54) GLASS COMPOSITION, GLASS SUBSTRATE FOR FLAT PANEL DISPLAY USING THE SAME, FLAT PANEL DISPLAY, AND METHOD FOR PRODUCING GLASS SUBSTRATE FOR FLAT PANEL DISPLAY

(71) Applicant: AvanStrate Inc., Yokkaichi-shi, Mie (JP)

(72) Inventors: Akihiro Koyama, Mie (JP); Mikiko Hashimoto, Mie (JP)

(73) Assignee: AvanStrate, Inc., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/015,495

(22) Filed: Aug. 30, 2013

(65) Prior Publication Data

US 2013/0345041 A1    Dec. 26, 2013

Related U.S. Application Data

(63) Continuation of application No. 12/969,080, filed on Dec. 15, 2010, now Pat. No. 8,575,050.

(30) Foreign Application Priority Data

Dec. 16, 2009    (JP) .................................. 2009-284809

(51) Int. Cl.
    *C03C 3/091*    (2006.01)

(52) U.S. Cl.
    CPC ...................................... *C03C 3/091* (2013.01)

(58) Field of Classification Search
    CPC ........................................................ C03C 3/091
    USPC ........................................................... 501/66
    See application file for complete search history.

(56) References Cited

U.S. PATENT DOCUMENTS

| 4,640,900 | A | 2/1987 | Kokubu et al. |
| 5,489,558 | A | 2/1996 | Moffatt et al. |
| 6,060,168 | A | 5/2000 | Kohli |
| 6,169,047 | B1 | 1/2001 | Nishizawa et al. |
| 6,297,182 | B1 | 10/2001 | Maeda et al. |
| 6,500,778 | B1 | 12/2002 | Maeda et al. |
| 6,867,158 | B2 | 3/2005 | Peuchert et al. |
| 6,949,485 | B2 | 9/2005 | Nakashima et al. |
| 7,888,276 | B2 | 2/2011 | Takaya et al. |
| 8,575,050 | B2 * | 11/2013 | Koyama et al. ................. 501/56 |
| 2002/0004111 | A1 | 1/2002 | Matsubara et al. |
| 2007/0213194 | A1 | 9/2007 | Abensour et al. |
| 2008/0076656 | A1 | 3/2008 | Suzuki et al. |
| 2008/0090717 | A1 | 4/2008 | Nagashima et al. |
| 2008/0194394 | A1 | 8/2008 | Lecomte |
| 2008/0206494 | A1 | 8/2008 | Kurachi et al. |
| 2009/0131238 | A1 | 5/2009 | Kishimoto et al. |
| 2009/0176640 | A1 | 7/2009 | Maehara et al. |
| 2009/0226671 | A1 | 9/2009 | Yanase et al. |
| 2009/0270242 | A1 | 10/2009 | Yanase et al. |
| 2009/0294773 | A1 | 12/2009 | Ellison |
| 2010/0045164 | A1 | 2/2010 | Fechner et al. |
| 2010/0084013 | A1 | 4/2010 | Eo et al. |
| 2010/0084016 | A1 | 4/2010 | Aitken et al. |

FOREIGN PATENT DOCUMENTS

| JP | 60-042247 | 3/1985 |
| JP | 11-292563 | 10/1999 |
| JP | 2002-087831 | 3/2002 |
| JP | 2006-169107 | 6/2006 |
| JP | 2007-039316 | 2/2007 |
| JP | 3988209 | 10/2007 |
| JP | 2008-001589 | 1/2008 |
| JP | 2009-13049 | 1/2009 |
| KR | 10-2008-0033517 | 4/2008 |
| KR | 10-2008-0079615 | 9/2008 |

\* cited by examiner

*Primary Examiner* — Anthony J Green
*Assistant Examiner* — Elizabeth A Bolden
(74) *Attorney, Agent, or Firm* — Hamre, Schumann, Mueller & Larson, P.C.

(57) ABSTRACT

Provided is a glass composition suitable for a glass substrate for a flat panel display such as a liquid crystal display. This glass composition has high thermal stability, and is substantially free of BaO but has a low devitrification temperature. It is suitable for the production of a glass substrate by a down-draw process. This glass composition contains, in terms of mass %: 54 to 62% of $SiO_2$; 4 to 11% of $B_2O_3$; 15 to 20% of $Al_2O_3$; 2 to 5% of MgO; 0 to 7% of CaO; 0 to 13.5% of SrO; 0 to 1% of $K_2O$; 0 to 1% of $SnO_2$; and 0 to 0.2% of $Fe_2O_3$, and is substantially free of BaO. In this glass composition, the total content of alkaline earth metal oxides (MgO+CaO+SrO) is 10 to 18.5 mass %. The devitrification temperature of the glass composition is 1200° C. or lower.

24 Claims, 8 Drawing Sheets

GLASS COMPOSITION, GLASS SUBSTRATE FOR FLAT PANEL DISPLAY USING THE SAME, FLAT PANEL DISPLAY, AND METHOD FOR PRODUCING GLASS SUBSTRATE FOR FLAT PANEL DISPLAY

BACKGROUND OF THE INVENTION

1. Field of the Invention

The present invention relates to a glass composition, and more particularly to a glass composition suitable for a glass substrate for a flat panel display (FPD) such as a liquid crystal display (LCD). The present invention also relates to an FPD glass substrate using this glass composition, a flat panel display, and a method of producing a glass substrate for a flat panel display.

2. Description of Related Art

There has been an increasing demand for flat type image display apparatuses called "flat panel displays (FPDs)" such as liquid crystal displays (LCDs). Among the FPDs, active matrix LCDs using thin film transistors (TFTs) have been widespread because they display high quality images. In an active matrix LCD, a TFT circuit is formed on the surface of a glass substrate. Conventionally, the step of forming a TFT circuit on the surface of a glass substrate is carried out in an environment of 1000° C. or higher. In recent years, however, a low-temperature polysilicon (p-Si) active matrix LCD, in which a TFT circuit can be formed at a temperature of 500 to 600° C., has been developed. This development makes it possible to use not only silica glass having stable physical properties under high temperature conditions but also aluminosilicate glass and aluminoborosilicate glass as glass substrates for LCDs.

An FPD glass substrate is required to have a small thickness and a very smooth surface. In addition, there is a strong demand for the production of larger glass substrates in response to a recent increase in the size of FPDs. There are various methods of producing glass substrates, and among them, a downdraw process is the best method for obtaining such glass substrates efficiently. In the downdraw process, molten glass is fed into a trough formed in the upper part of a glass sheet forming apparatus, and the molten glass flowing over the both edges of the trough is allowed to flow downward along the outer wall of the forming apparatus. Then, two streams of molten glass are fused together at the lower end (root) of the forming apparatus so as to produce a single glass ribbon continuously. After the glass ribbon solidifies, it is cut into pieces of a desired size. Thus, glass substrates are obtained.

Compared with a float process, which is another method for producing glass substrates, the downdraw process has a drawback in that glass substrates are susceptible to devitrification because they are formed at a lower temperature. Therefore, a glass composition having a low devitrification temperature is required in order to produce a glass substrate stably by the downdraw process. In addition, in order to form a TFT circuit on a glass substrate stably, a glass composition is required to have high thermal stability (for example, a high glass transition temperature or a high strain point).

As glass compositions for use as FPD glass substrates, for example, there have been known the following compositions.

JP 2006-169107 A discloses an aluminosilicate glass composition that can be produced by a method other than the downdraw process. This aluminosilicate glass composition is substantially free of alkali metal oxides, and consists essentially of, in terms of mass %: 60 to 67% of $SiO_2$; 16 to 23% of $Al_2O_3$; 0 to 15% of $B_2O_3$; 0 to 8% of MgO, 0 to 18% of CaO, 0 to 15% of SrO, and 0 to 21% of BaO. The total content of MgO, CaO, SrO, and BaO is 12 to 30%. This composition is not, however, suitable for the downdraw process. Furthermore, as shown in Examples, this composition has a high content of BaO, which is not desirable in view of its environmental load and production cost.

JP 3988209 B2 discloses a glass composition suitable for a glass substrate for an FPD. This glass composition is substantially free of alkali metal oxides, and can be formed by the float process. This composition is not, however, suitable for the downdraw process because it has a high devitrification temperature of 1250° C. as shown in Examples.

JP 2009-013049 A discloses a glass composition being free of alkali metal oxides, $As_2O_3$, and $Sb_2O_3$, containing, in terms of mol %, 55 to 75% of $SiO_2$, 7 to 15% of $Al_2O_3$, 7 to 12% of $B_2O_3$, 0 to 3% of MgO, 7 to 12% of CaO, 0 to 5% of SrO, 0 to 2% of BaO, 0 to 5% of ZnO, and 0.01 to 1% of $SnO_2$, having a liquidus viscosity of $10^{5.2}$ dPa·s or higher, and having a temperature of 1550° C. or lower at a high temperature viscosity of $10^{2.5}$ dPa·s.

BaO, which is one of the glass components, is known to have effects of suppressing the phase separation of glass, improving the meltability, and decreasing the devitrification temperature (see paragraph 0023 of JP 3988209 B2). However, BaO has a high environmental load and its raw material is expensive, which results in an increase in the production cost of a glass substrate. Therefore, glass compositions substantially free of BaO are needed.

SUMMARY OF THE INVENTION

It is an object of the present invention to provide a glass composition being suitable for an FPD glass substrate, having high thermal stability, being substantially free of BaO but having a low devitrification temperature, and being suitable for the production of a glass substrate by the downdraw process.

The glass composition of the present invention contains, in terms of mass %: 54 to 62% of $SiO_2$; 4 to 11% of $B_2O_3$; 15 to 20% of $Al_2O_3$; 2 to 5% of MgO; 0 to 7% of CaO; 0 to 13.5% of SrO; 0 to 1% of $K_2O$; 0 to 1% of $SnO_2$; and 0 to 0.2% of $Fe_2O_3$. This glass composition is substantially free of BaO, the total content of alkaline earth metal oxides (MgO+CaO+SrO) is 10 to 18.5 mass %, and the devitrification temperature of the glass composition is 1200° C. or lower.

The FPD glass substrate of the present invention is composed of the glass composition of the present invention.

The FPD of the present invention includes the FPD glass substrate of the present invention.

In the production method of the present invention, a melt of the glass composition of the present invention is formed into a glass substrate for an FPD by a downdraw process.

The glass composition of the present invention is suitable for a glass substrate for an FPD. This glass composition has high thermal stability. This glass composition has a low devitrification temperature even though it is substantially free of BaO. This glass composition is suitable for the production of a glass substrate by the downdraw process.

BRIEF DESCRIPTION OF THE DRAWINGS

In FIG. 1, the devitrification temperature is plotted as a function of the percentage (CaO/ROs) of CaO in all the alkaline earth metal oxides (ROs).

In FIG. 2, the devitrification temperature is plotted as a function of the percentage (SrO/ROs) of SrO in all the alkaline earth metal oxides (ROs).

DETAILED DESCRIPTION OF THE INVENTION

Figure 1:
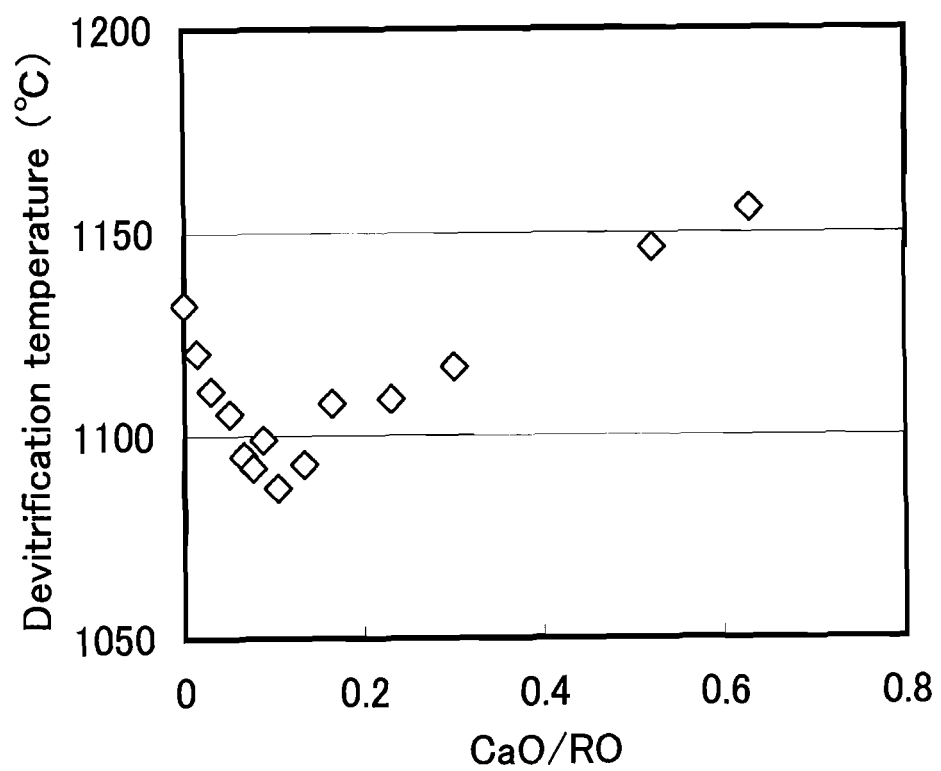
FIG. 1 is a graph showing the dependence of the devitrification temperature of the glass composition of the present invention on the balance between the content of CaO and the content of SrO.

The reasons for determining the composition of the glass composition of the present invention are described below. In the following description, the unit "%" which expresses the contents of the components denotes "mass %".

($SiO_2$)

$SiO_2$ is a component for forming a glass skeleton, and has an effect of increasing the chemical durability and heat resistance of the glass. When the content of $SiO_2$ is less than 54%, such an effect cannot be obtained sufficiently. On the other hand, when the content of $SiO_2$ is more than 62%, the devitrification temperature of the glass increases. Furthermore, the melt viscosity of the glass increases as the meltability thereof deteriorates, which makes it difficult to form a glass substrate by the downdrawn process. Therefore, the $SiO_2$ content is 54% or more, preferably 55.5% or more, and more preferably 56.5% or more, focusing on its lower limit. The $SiO_2$ content is 62% or less, preferably 60% or less, and further preferably less than 58.4%, focusing on its upper limit. The content of $SiO_2$ is 54% or more and 62% or less, preferably 55.5% or more and 60% or less, and more preferably 56.5% or more and 58.4% or less.

($B_2O_3$)

$B_2O_3$ is a component for decreasing the viscosity of glass and promoting the melting and refining of the glass. When the content of $B_2O_3$ is less than 4%, the meltability of the glass deteriorates, which makes it difficult to form a glass substrate by the downdraw process. On the other hand, when the content of $B_2O_3$ is more than 11%, the volatilization of $B_2O_3$ from the surface of the molten glass increases, which makes it difficult to homogenize the glass. Therefore, the $B_2O_3$ content is 4% or more, preferably 7% or more, and more preferably 8% or more, focusing on its lower limit. The $B_2O_3$ content is 11% or less, and more preferably 10% or less, focusing on its upper limit. The content of $B_2O_3$ is 4% or more and 11% or less, preferably 7% or more and 11% or less, and more preferably 8% or more and 10% or less.

($Al_2O_3$)

$Al_2O_3$ is a component for forming a glass skeleton, and has an effect of increasing the strain point of glass. A glass substrate used for a polysilicon (p-Si) LCD is required to have high thermal stability when a TFT circuit is formed thereon at a temperature of 500 to 600° C. Therefore, $Al_2O_3$, which has an effect of increasing the strain point of glass, is an important component for the glass composition of the present invention. When the content of $Al_2O_3$ is less than 15%, the strain point of the glass decreases, and as a result, a glass composition suitable for a glass substrate for an FPD is not obtained. On the other hand, when the content of $Al_2O_3$ is more than 20%, the acid resistance of the glass decreases, and the glass cannot withstand the acid treatment step in the production of FPDs, for example. Therefore, the $Al_2O_3$ content is 15% or more, preferably 16% or more, and more preferably 18% or more, focusing on its lower limit. The $Al_2O_3$ content is 20% or less, focusing on its upper limit. The content of $Al_2O_3$ is 15% or more and 20% or less, preferably 16% or more and 20% or less, and more preferably 18% or more and 20% or less.

(MgO)

MgO is a component for decreasing the viscosity of glass and promoting the melting and refining of the glass. MgO further has an effect of decreasing the density of glass, and therefore it is effective in reducing the weight of the resulting glass and improving the meltability thereof. When the content of MgO is less than 2%, the meltability of the glass deteriorates, which makes it difficult to form a glass substrate by the downdraw process. On the other hand, when the content of MgO is more than 5%, the glass phase separation develops and thereby the acid resistance thereof decreases. As a result, the glass cannot withstand the acid treatment step in the production of FPDs, for example. Therefore, the MgO content is 2% or more, and preferably 3% or more, focusing on its lower limit. The MgO content is 5% or less, focusing on its upper limit. The content of MgO is 2% or more and 5% or less, and preferably 3% or more and 5% or less.

(CaO)

CaO is a component for decreasing the viscosity of glass and promoting the melting and refining of the glass. The glass composition of the present invention does not necessarily need to contain CaO, but preferably it contains CaO to improve the meltability of the glass and stabilize the production of a glass substrate by the downdraw process. Furthermore, a proper balance between the CaO content and the SrO content in the glass composition of the present invention allows the glass composition to have a lower devitrification temperature while maintaining high thermal stability thereof. In order to strike the balance, CaO needs to be contained in the glass composition. On the other hand, an excessively high content of CaO causes devitrification of glass. Therefore, such an excessively high content of CaO is not preferable. From these points of view, the CaO content is 0% or more, and preferably 0.2% or more, focusing on its lower limit. The CaO content is 7% or less, and preferably 4.5% or less, focusing on its upper limit. The content of CaO is 0% or more and 7% or less, and preferably 0.2% or more and 4.5% or less.

(SrO)

SrO is a component for decreasing the viscosity of glass and promoting the melting and refining of the glass. The glass composition of the present invention does not necessarily need to contain SrO, but preferably it contains SrO to improve the meltability of the glass and stabilize the production of a glass substrate by the downdraw process. Furthermore, in order to strike the balance between the CaO content and the SrO content, SrO needs to be contained in the glass composition. Moreover, the glass composition of the present invention is substantially free of BaO. From this point of view, too, SrO preferably is added. On the other hand, an excessively high content of SrO decreases the acid resistance of the glass, and as a result, the glass cannot withstand the acid treatment step in the production of FPDs, for example. From these points of view, the SrO content is 0% or more, and preferably 5% or more, focusing on its lower limit. The SrO content is 13.5% or less, preferably 12% or less, and more preferably 11.5% or less, focusing on its upper limit. The content of SrO is 0% or more and 13.5% or less, preferably 0% or more and 12% or less, and more preferably 5% or more and 11.5% or less.

(BaO)

The glass composition of the present invention is substantially free of BaO. Therefore, the glass composition of the present invention has a low environmental load and its production cost is low.

In the present description, "substantially free" means that a trace amount of impurities that have been inevitably mixed during the industrial production of the glass composition, such as impurities derived from the raw materials, may be contained. Specifically, "substantially free" is defined as the content of less than 0.5%, preferably less than 0.3%, and more preferably less than 0.1%.

(RO)

An alkaline earth metal oxide RO (where R is Mg, Ca, or Sr) is a component having an effect on the melt viscosity of glass. When the total content of ROs (MgO +CaO+SrO) is less than 10%, the meltability of the glass decreases, which makes it difficult to form a glass substrate by the downdraw process. On the other hand, when the total content thereof is more than 18.5%, the acid resistance of the glass decreases, and the glass cannot withstand the acid treatment step in the production of FDPs, for example. Therefore, the total content of ROs is 10% or more, and preferably 12% or more, focusing on its lower limit. The total content of ROs is 18.5% or less, and preferably 16% or less, focusing on its upper limit. The total content of ROs is 10% or more and 18.5% or less, preferably 10% or more and 16% or less, and more preferably 12% or more and 16% or less.

In the glass composition of the present invention, it is preferable that the mass ratio $Y^1/X$ of the MgO content $Y^1$ to the total content X of ROs be 0.2 to 0.3, the mass ratio $Y^2/X$ of the CaO content $Y^2$ to the total content X be 0.01 to 0.3, and the mass ratio $Y^3/X$ of the SrO content $Y^3$ to the total content X be 0.4 to 0.74. In this case, a glass composition having a lower devitrification temperature while maintaining high thermal stability is obtained.

Figure 2:
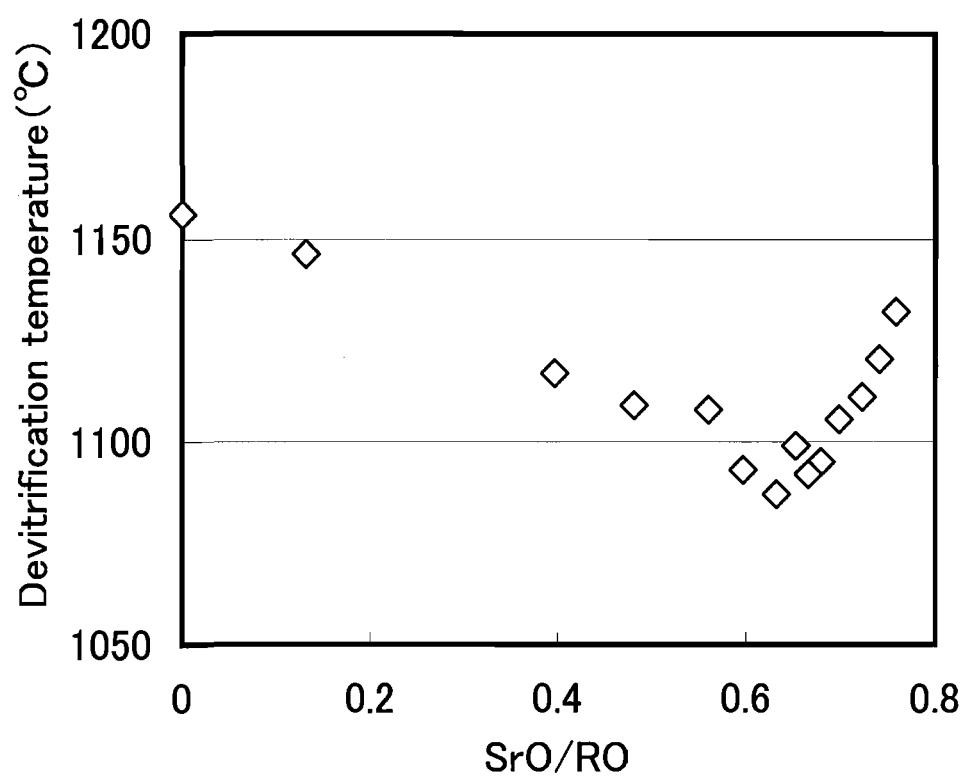
FIG. 2 is a graph showing the dependence of the devitrification temperature of the glass composition of the present invention on the balance between the content of CaO and the content of SrO.

Specifically, a balance is kept between the percentage of CaO in all the ROs and the percentage of SrO therein while the percentage of MgO in all the ROs is maintained in a fixed range. As a result, a glass composition having a lower devitrification temperature while maintaining high thermal stability is obtained. FIG. 1 and FIG. 2 show the dependence of the devitrification temperature of the glass composition of the present invention on the balance between the percentage of CaO and the percentage of SrO in all the ROs. In this dependence, the percentage of MgO in all the ROs is almost constant. The horizontal axis of FIG. 1 indicates the mass ratio $Y^2/X$ of the CaO content $Y^2$ to the total content X of ROs (that is, the percentage CaO/ROs of CaO in all the ROs). The horizontal axis of FIG. 2 indicates the mass ratio $Y^3/X$ of the SrO content $Y^3$ to the total content X of ROs (that is, the percentage SrO/ROs of SrO in all the ROs). Specific glass compositions are shown in Table 1 below.

TABLE 1

Content of each component and total content of ROs are expressed in mass %

| $SiO_2$ | $B_2O_3$ | $Al_2O_3$ | MgO | CaO | SrO | $K_2O$ | $SnO_2$ | $Fe_2O_3$ | Total content of ROs | MgO/ RO total | CaO/ RO total | SrO/ RO total | Devitrification temperature (°C.) |
|---|---|---|---|---|---|---|---|---|---|---|---|---|---|
| 56.6 | 9.2 | 18.3 | 3.7 | 0.0 | 11.7 | 0.24 | 0.20 | 0.08 | 15.4 | 0.24 | 0.00 | 0.76 | 1132 |
| 56.6 | 9.2 | 18.3 | 3.7 | 0.0 | 11.7 | 0.24 | 0.20 | 0.08 | 15.4 | 0.24 | 0.00 | 0.76 | 1132 |
| 56.7 | 9.2 | 18.3 | 3.7 | 0.2 | 11.3 | 0.24 | 0.20 | 0.08 | 15.3 | 0.24 | 0.01 | 0.74 | 1120 |
| 56.8 | 9.3 | 18.3 | 3.7 | 0.4 | 10.9 | 0.24 | 0.20 | 0.08 | 15.1 | 0.25 | 0.03 | 0.72 | 1111 |
| 56.9 | 9.3 | 18.4 | 3.8 | 0.7 | 10.4 | 0.24 | 0.20 | 0.08 | 14.9 | 0.25 | 0.05 | 0.70 | 1106 |
| 57.0 | 9.3 | 18.4 | 3.8 | 1.0 | 10.0 | 0.24 | 0.20 | 0.08 | 14.7 | 0.25 | 0.07 | 0.68 | 1095 |
| 57.1 | 9.3 | 18.4 | 3.8 | 1.1 | 9.7 | 0.24 | 0.20 | 0.08 | 14.6 | 0.26 | 0.08 | 0.67 | 1092 |
| 57.2 | 9.3 | 18.4 | 3.8 | 1.3 | 9.5 | 0.24 | 0.20 | 0.08 | 14.5 | 0.26 | 0.09 | 0.65 | 1099 |
| 57.3 | 9.3 | 18.5 | 3.8 | 1.5 | 9.1 | 0.24 | 0.20 | 0.08 | 14.4 | 0.26 | 0.10 | 0.63 | 1087 |
| 57.5 | 9.4 | 18.5 | 3.8 | 1.9 | 8.4 | 0.24 | 0.20 | 0.08 | 14.1 | 0.27 | 0.13 | 0.60 | 1093 |
| 57.7 | 9.4 | 18.6 | 3.8 | 2.3 | 7.7 | 0.24 | 0.20 | 0.08 | 13.8 | 0.28 | 0.16 | 0.56 | 1108 |
| 58.0 | 9.5 | 18.7 | 3.8 | 3.1 | 6.4 | 0.24 | 0.20 | 0.08 | 13.3 | 0.29 | 0.23 | 0.48 | 1109 |
| 58.4 | 9.5 | 18.8 | 3.8 | 3.8 | 5.0 | 0.24 | 0.21 | 0.08 | 12.7 | 0.30 | 0.30 | 0.40 | 1117 |
| 59.4 | 9.7 | 19.2 | 3.9 | 5.9 | 1.5 | 0.25 | 0.21 | 0.08 | 11.2 | 0.35 | 0.52 | 0.13 | 1146 |
| 59.8 | 9.8 | 19.3 | 3.9 | 6.7 | 0.0 | 0.25 | 0.21 | 0.08 | 10.6 | 0.37 | 0.63 | 0.00 | 1156 |

As shown in FIG. 1 and FIG. 2, the devitrification temperature of the glass is lowered when the mass ratio $Y^1/X$ of MgO to ROs is 0.2 to 0.3, the mass ratio $Y^2/X$ of CaO to ROs is 0.01 to 0.3, and the mass ratio $Y^3/X$ of SrO to ROs is 0.4 to 0.74. The devitrification temperature of the glass is lowered further when the mass ratio $Y^1/X$ of MgO to ROs is 0.2 to 0.3 and the mass ratio $Y^2/X$ of CaO to ROs is 0.05 to 0.23. Likewise, the devitrification temperature of the glass is lowered further when the mass ratio $Y^1/X$ of MgO to ROs is 0.2 to 0.3 and the mass ratio $Y^3/X$ of SrO to ROs is 0.48 to 0.70. Furthermore, the devitrification temperature of the glass shows a relative minimum value in the above ranges. In the glass compositions shown in Table 1, particularly low devitrification temperatures are obtained when the mass ratio $Y^2/X$ is 0.07 to 0.13 and/or the mass ratio $Y^3/X$ is 0.60 to 0.68, although the devitrification temperature also depends on the contents of the other components.

($K_2O$)

The glass composition of the present invention may contain $K_2O$ to adjust the thermal properties of the glass. The content of $K_2O$ is 0% or more and 1% or less.

Figure 3:
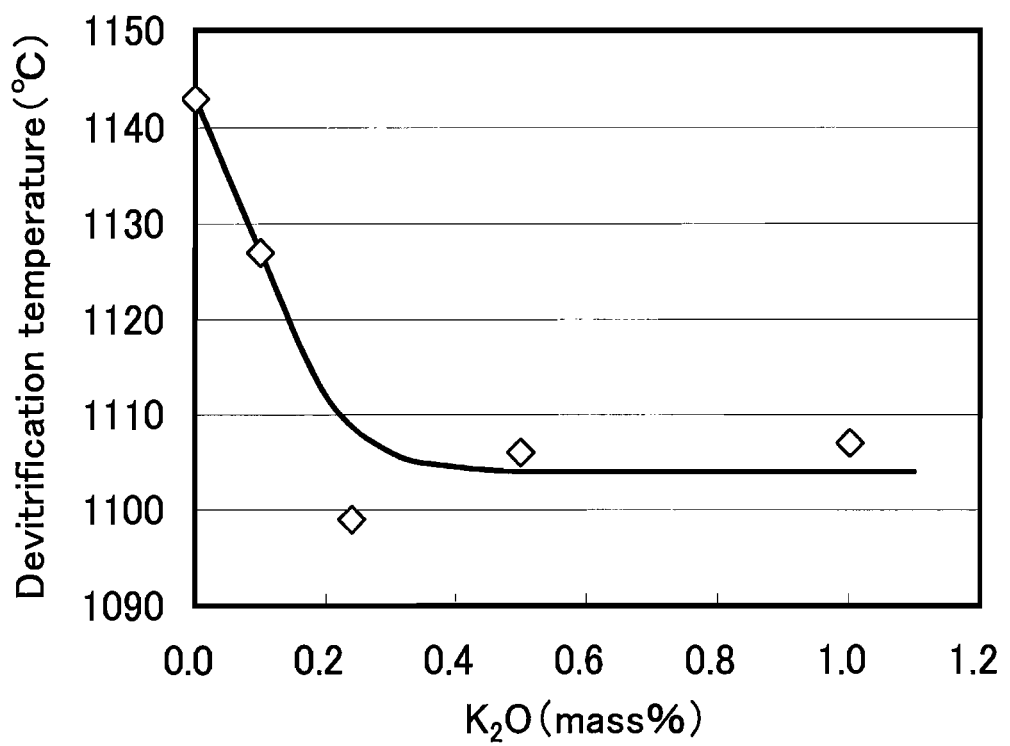
FIG. 3 is a graph showing the devitrification temperature of the glass composition of the present invention as a function of the content of $K_2O$.
Figure 4:
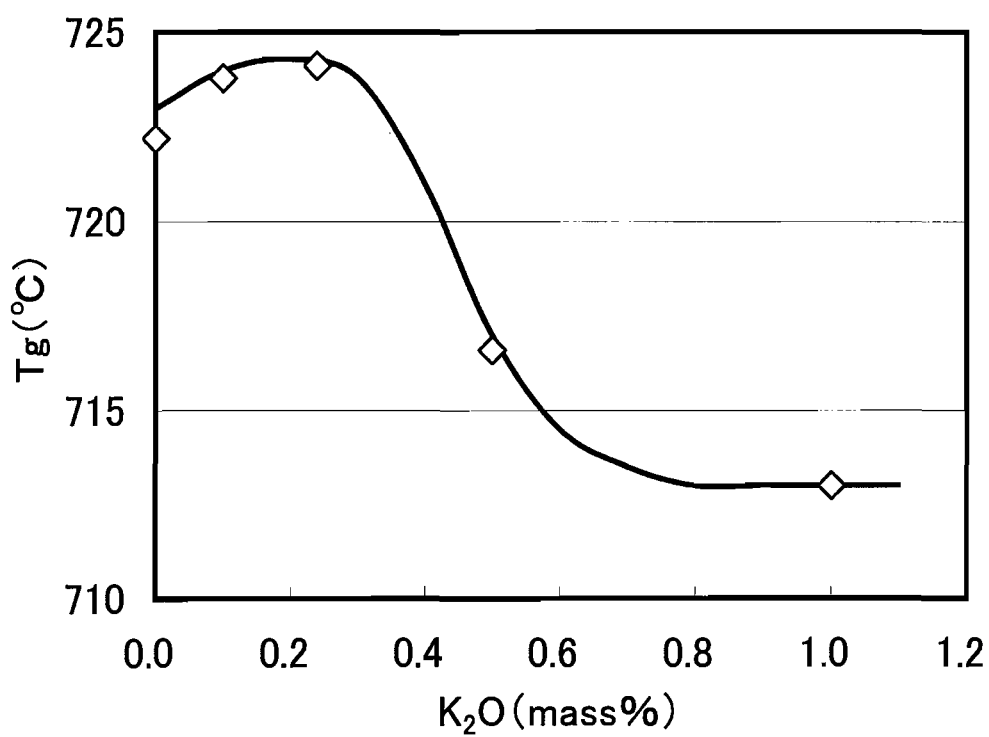
FIG. 4 is a graph showing the glass transition temperature of the glass composition of the present invention as a function of the content of $K_2O$.
Figure 5:
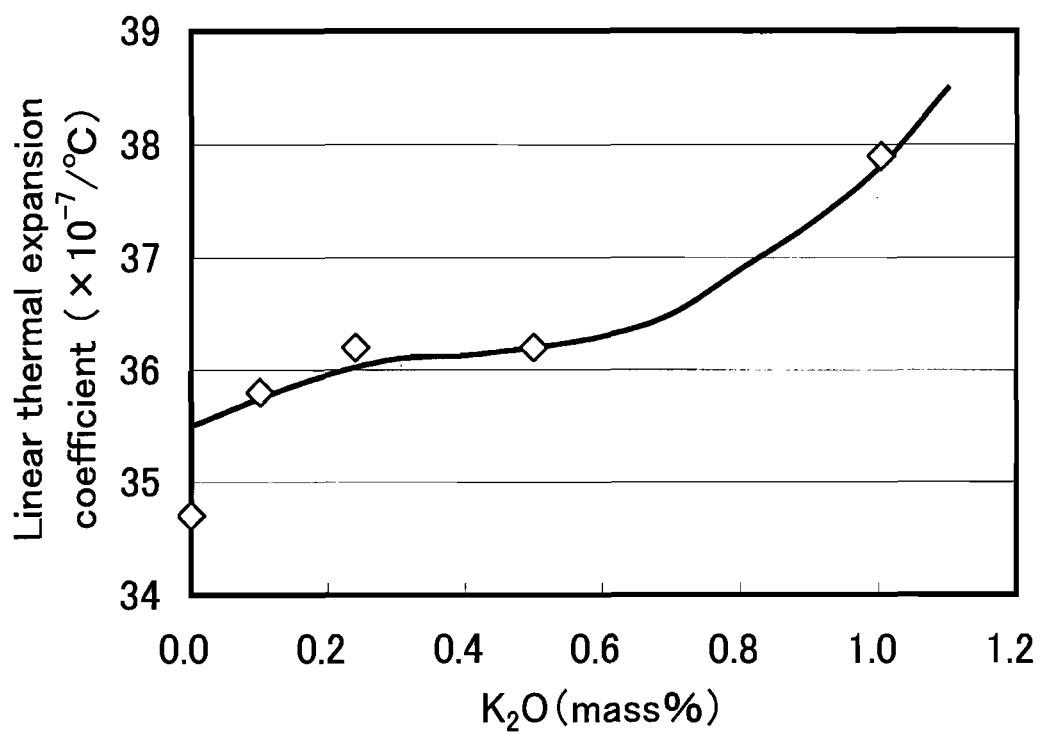
FIG. 5 is a graph showing the linear thermal expansion coefficient of the glass composition of the present invention as a function of the content of $K_2O$.

The present inventors have found that there are special relationships between the $K_2O$ content, and the devitrification temperature, the glass transition temperature (Tg) and the linear thermal expansion coefficient of the glass composition of the present invention. FIG. 3 to FIG. 5 show the dependence of the devitrification temperature, that of the Tg, and that of the linear thermal expansion coefficient of the glass composition of the present invention, on the $K_2O$ content. In these dependences, the contents of the components other than $K_2O$ are almost constant. Specific glass compositions are shown in Table 2 below.

TABLE 2

Content of each component and total content of ROs are expressed in mass %

| $SiO_2$ | $B_2O_3$ | $Al_2O_3$ | MgO | CaO | SrO | $K_2O$ | $SnO_2$ | $Fe_2O_3$ | Total content of ROs | Devitrification temperature (° C.) | Tg (° C.) | Linear thermal expansion coefficient ($\times 10^{-7}$/° C.) |
|---|---|---|---|---|---|---|---|---|---|---|---|---|
| 56.7 | 9.3 | 18.3 | 3.7 | 1.3 | 9.4 | 1.00 | 0.20 | 0.08 | 14.4 | 1107 | 713 | 38 |
| 57.0 | 9.3 | 18.4 | 3.8 | 1.3 | 9.5 | 0.50 | 0.20 | 0.08 | 14.5 | 1106 | 717 | 36 |
| 57.2 | 9.3 | 18.4 | 3.8 | 1.3 | 9.5 | 0.24 | 0.20 | 0.08 | 14.5 | 1099 | 724 | 36 |
| 57.3 | 9.3 | 18.5 | 3.8 | 1.3 | 9.5 | 0.10 | 0.20 | 0.08 | 14.5 | 1127 | 724 | 36 |
| 57.3 | 9.4 | 18.5 | 3.8 | 1.3 | 9.5 | 0.00 | 0.20 | 0.08 | 14.6 | 1143 | 722 | 35 |

As shown in FIG. 3, in the glass composition of the present invention, the addition of 0.1% or more of $K_2O$ to the composition brings about a tendency for the devitrification temperature to drop sharply. Meanwhile, when the $K_2O$ content exceeds 1%, the decreasing tendency of the devitrification temperature is not seen. From this point of view, the content of $K_2O$ preferably is 0.1% or more and 1% or less. A low devitrification temperature is required in order to produce a glass substrate by the downdraw process.

On the other hand, it is desirable that a glass substrate for an FPD have stable physical properties, that is, high thermal stability, even during the formation of a TFT circuit thereon. As the Tg increases and the linear thermal expansion coefficient decreases, the thermal stability of the glass is enhanced. FIG. 4 shows that when the content of $K_2O$ is 0.5% or more, the Tg drops sharply. FIG. 5 shows that when the content of $K_2O$ is more than 0.5%, the linear thermal expansion coefficient rises sharply. That is, more preferably, the content of $K_2O$ is 0.1% or more and less than 0.5%. In this case, a better balance among the devitrification temperature, Tg, and linear thermal expansion coefficient is achieved.

There is a correlation between the glass transition temperature Tg and the above-mentioned strain point, and the approximate value of the strain point can be calculated from the Tg value. Normally, the higher the glass transition temperature Tg is, the higher the strain point is.

($SnO_2$)

$SnO_2$ is a component having an effect of causing molten glass at high temperatures to produce gas by the valence change of Sn. Such a component can be used for refining glass. Conventionally, $As_2O_3$, $Sb_2O_3$, etc. are used for refining glass. With a recent growing awareness of environmental issues, there has been a demand for glass compositions not containing these materials as refining agents. $SnO_2$ has a low environmental load and a high refining effect. Therefore, preferably, the glass composition of the present invention contains $SnO_2$. $SnO_2$ is, however, a component that causes glass to devitrify easily, and therefore, care should be taken to prevent the content of $SnO_2$ from increasing excessively. From these points of view, the $SnO_2$ content is 0% or more, and preferably 0.1% or more, focusing on its lower limit. The $SnO_2$ content is 1% or less, and preferably 0.5% or less, focusing on its upper limit. The content of $SnO_2$ is 0% or more and 1% or less, preferably 0.1% or more and 1% or less, and more preferably 0.1% or more and 0.5% or less.

($Fe_2O_3$)

$Fe_2O_3$ is a component having effects of refining and coloring glass. In order to use the glass composition of the present invention as a glass substrate for an FPD, it is desired that the content of $Fe_2O_3$ be in the range where the refining effect is enhanced but the quality of the FPD glass substrate does not deteriorate. From this point of view, the $Fe_2O_3$ content is 0% or more, and preferably 0.05% or more, focusing on its lower limit. The $Fe_2O_3$ content is 0.2% or less, preferably 0.15% or less, and more preferably 0.1% or less, focusing on its upper limit. The content of $Fe_2O_3$ is 0% or more and 0.2% or less, preferably 0.05% or more and 0.2% or less, more preferably 0.05% or more and 0.15% or less, and further preferably 0.05% or more and 0.1% or less.

The glass composition of the present invention may contain other components, such as $Li_2O$, $Na_2O$, $TiO_2$, Cl, $SO_3$, and ZnO, as refining agents or as components for adjusting the physical properties, in addition to the above-mentioned components, as long as the total content of the other components is in the range of 0.5% or less.

The glass composition of the present invention may consist essentially of the above-mentioned components, specifically, $SiO_2$, $B_2O_3$, $Al_2O_3$, MgO, CaO, SrO, $K_2O$, $SnO_2$, $Fe_2O_3$, other components added for the purpose of adjusting the physical properties, and refining agents. In this case, the glass composition of the present invention is substantially free of components other than the above-mentioned components. In this description, "consists essentially of a set of components X" means that a glass composition referred to is substantially free of components other than the set of components X.

Specifically, the glass composition of the present invention may be a glass composition consisting essentially of, in terms of mass %: 54 to 62% of $SiO_2$; 4 to 11% of $B_2O_3$; 15 to 20% of $Al_2O_3$; 2 to 5% of MgO; 0 to 7% of CaO; 0 to 13.5% of SrO; 0 to 1% of $K_2O$; 0 to 1% of $SnO_2$; and 0 to 0.2% of $Fe_2O_3$. In this glass composition, the total content of alkaline earth metal oxides (MgO+CaO+SrO) is 10 to 18.5%, and the devitrification temperature is 1200° C. or lower.

Preferably, the glass composition of the present invention is a glass composition in which the content of $SiO_2$ is 55.5% or more and 60% or less, the content of $B_2O_3$ is 7% or more and 11% or less, the content of $Al_2O_3$ is 16% or more and 20% or less, and the content of SrO is 0% or more and 12% or less. In this glass composition, the total content of the alkaline earth metal oxides (MgO+CaO+SrO) is 10% or more and 16% or less, and the devitrification temperature is 1160° C. or lower. This also applies to the case where the glass composition of the present invention is a glass composition consisting essentially of the above-mentioned components.

Preferably, the glass composition of the present invention is a glass composition in which the content of $SiO_2$ is 56.5% or more and less than 58.4%, the content of $B_2O_3$ is 8% or more and 10% or less, the content of $Al_2O_3$ is 18% or more and 20% or less, the content of MgO is 3% or more and 5% or less, the content of CaO is 0.2% or more and 4.5% or less, the content of SrO is 5% or more and 11.5% or less, and the content of $K_2O$ is 0.1% or more and 1% or less. In this glass composition, the total content of the alkaline earth metal oxides (MgO+CaO+SrO) is 12% or more and 16% or less, the mass ratio $Y^1/X$ of the MgO content $Y^1$ to the total content X of the alkaline earth metal oxides ROs is 0.2 to 0.3, the mass ratio $Y^2/X$ of the CaO content $Y^2$ to the total content X of ROs is 0.01 to 0.3, and the mass ratio $Y^3/X$ of the SrO content $Y^3$ to the total content X of ROs is 0.4 to 0.74, and the devitrification temperature is 1130° C. or lower. This also applies to the case where the glass composition of the present invention is a glass composition consisting essentially of the above-mentioned components.

The devitrification temperature of the glass composition of the present invention is 1200° C. or lower, and it is decreased to 1160° C. or lower or further to 1130° C. or lower in certain compositions. The devitrification temperature can be decreased to 1120° C. or lower, 1110° C. or lower, or 1100° C. or lower in some cases, as shown in the examples described below.

The Tg of the glass composition of the present invention is 710° C. or higher, for example, and it can be raised to 720° C. or higher in certain compositions. The glass composition of the present invention having such a high Tg has high thermal stability, and therefore, it is particularly suitable for use as a glass substrate for a polysilicon LCD.

The strain point of the glass composition of the present invention is 665° C. or higher, for example, and it can be raised to 670° C. or higher in certain compositions. The glass composition of the present invention having such a high strain point has high thermal stability, and therefore, it is particularly suitable for use as a glass substrate for a polysilicon LCD.

The thermal expansion coefficient of the glass composition of the present invention is $3 \times 10^{-7}/°$ C. to $38 \times 10^{-7}/°$ C., for example, in terms of a linear thermal expansion coefficient in the range of 50° C. to 300° C. The glass composition of the present invention having such a low thermal expansion coefficient has high thermal stability, and therefore, it is particularly suitable for use as a glass substrate for a polysilicon LCD.

As described above, in the downdraw process, molten glass is allowed to flow downward along the outer wall of a glass sheet forming apparatus. Therefore, the molten glass must have a viscosity that allows the glass to flow sufficiently. Specifically, if the viscosity of the molten glass is high during the forming step, its poor fluidity causes the glass to be more susceptible to forming defects.

Generally, in the forming step of the float process, the viscosity of the molten glass fed into a float bath is about 1000 Pa·s. In contrast, in the forming step of the downdraw process, the viscosity of the molten glass must be controlled at 4000 Pa·s to 50000 Pa·s.

In addition, in the downdraw process, the creep deformation of the forming member used in the glass sheet forming apparatus causes a problem. Therefore, preferably, the glass is formed at a lower temperature. For example, it is desired that the temperature of the molten glass be 1200° C. or lower when it is in contact with the forming member. Furthermore, in the downdraw process, if the temperature of a portion of the forming member that is in contact with the molten glass (for example, the above-mentioned outer wall) is equal to or lower than the devitrification temperature of the glass, a devitrified substance is produced at a portion of the glass that is in contact with the forming member. As a result, the forming quality deteriorates, or the forming operation itself cannot be performed. For these reasons, a glass to be produced by the downdraw process is required to have a particularly low devitrification temperature, compared to a glass to be produced by the float process.

The glass composition of the present invention has a particularly low devitrification temperature, and therefore is suitable for the downdraw process. Glass forming processes other than the downdraw process can be used as long as a desired glass article can be obtained.

The glass composition of the present invention is suitable for the production of glass substrates by the downdraw process, and it is suitable for the production of glass substrates for FPDs.

The glass substrate for an FPD of the present invention is composed of the glass composition of the present invention, and has physical properties corresponding to the physical properties of the glass composition of the present invention (for example, thermal properties such as strain point, Tg, and thermal expansion coefficient).

Figure 6:
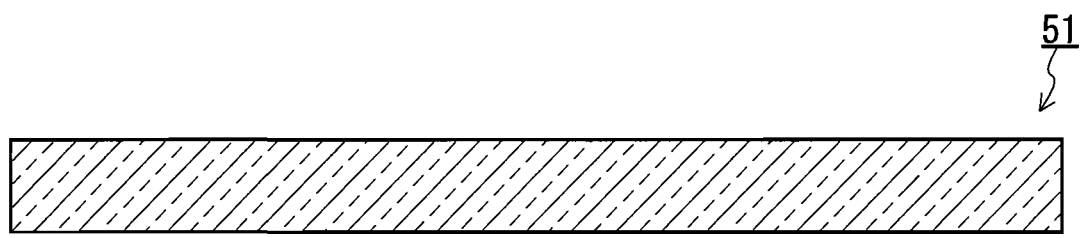
FIG. 6 is a schematic cross sectional view of a glass substrate for a flat panel display (FPD) of the present invention as an example.

FIG. 6 shows an FPD glass substrate of the present invention. An FPD glass substrate 51 shown in FIG. 6 is composed of the glass composition of the present invention.

The FPD glass substrate of the present invention is suitable as a glass substrate for an LCD, in particular, as a glass substrate used for a polysilicon (p-Si) LCD on which a TFT circuit is formed at a temperature ranging from 500 to 600° C.

Typically, the FPD glass substrate of the present invention is formed by forming the glass composition of the present invention by the downdraw process. That is, the FPD glass substrate of the present invention is a glass substrate obtained by forming the glass composition of the present invention by the downdraw process. In the case where the FPD glass substrate of the present invention is a glass substrate obtained by the downdraw process, it has higher surface smoothness than glass substrates obtained by other processes, and therefore is particularly suitable as a glass substrate for an LCD.

The FPD glass substrate of the present invention can be used as, for example, a front panel and/or a rear panel of an FPD such as an LCD.

The FPDs to which the FPD glass substrate of the present invention can be applied are not limited to any particular type. The FPDs are, for example, liquid crystal displays (LCDs), electroluminescent displays (ELDs), and field emission displays (FEDs). The FPDs to which the FPD glass substrate of the present invention can be applied are typically LCDs, and particularly preferably polysilicon LCDs.

Figure 7:
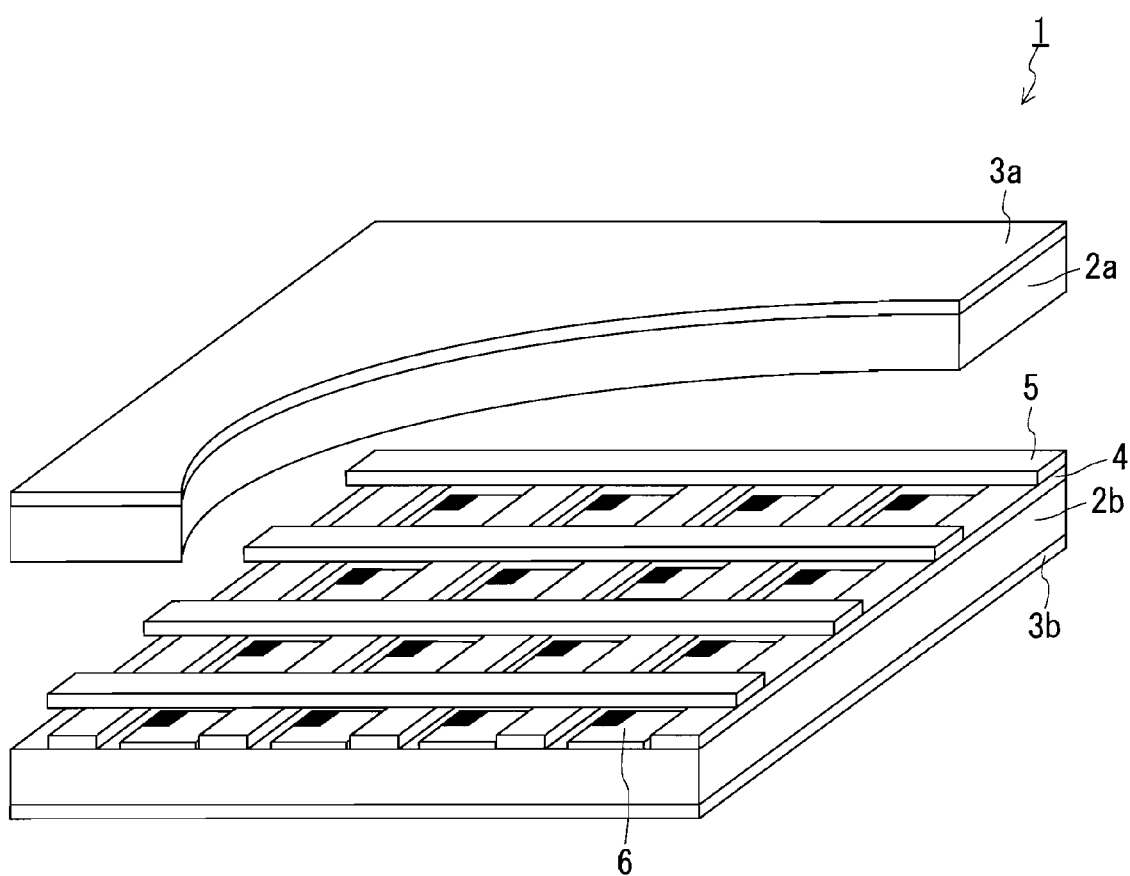
FIG. 7 is a schematic exploded view of a flat panel display (FPD) of the present invention as an example.

The FPD of the present invention includes the FPD glass substrate of the present invention. FIG. 7 shows an example of the FPD of the present invention. An FPD 1 shown in FIG. 7 is a polysilicon active matrix LCD. The FPD 1 includes a pair of glass substrates 2a and 2b, and a pair of oriented films 3a and 3b. The oriented film 3a is disposed in contact with the glass substrate 2a, and the oriented film 3b is disposed in contact with the glass substrate 2b. Scanning lines 4, signal lines 5, and cells 6 each having a thin film transistor (TFT) are arranged on the glass substrate 2b. Each of the cells 6 is formed in an intersection region that is surrounded by the scanning lines 4 and the signal lines 5 in plan view. In the FPD 1, at least one substrate selected from the glass substrates 2a and 2b is the FPD glass substrate of the present invention. In other words, this at least one of the substrates is composed of the glass composition of the present invention. Preferably, the glass substrate 2b on which the cells 6 each having a TFT are formed, among the glass substrates 2a and 2b, is the FPD glass substrate of the present invention.

The type and structure of the FPD of the present invention is not limited to those of the example shown in FIG. 7, as long as the FPD includes the FPD glass substrate of the present invention.

Figure 8:
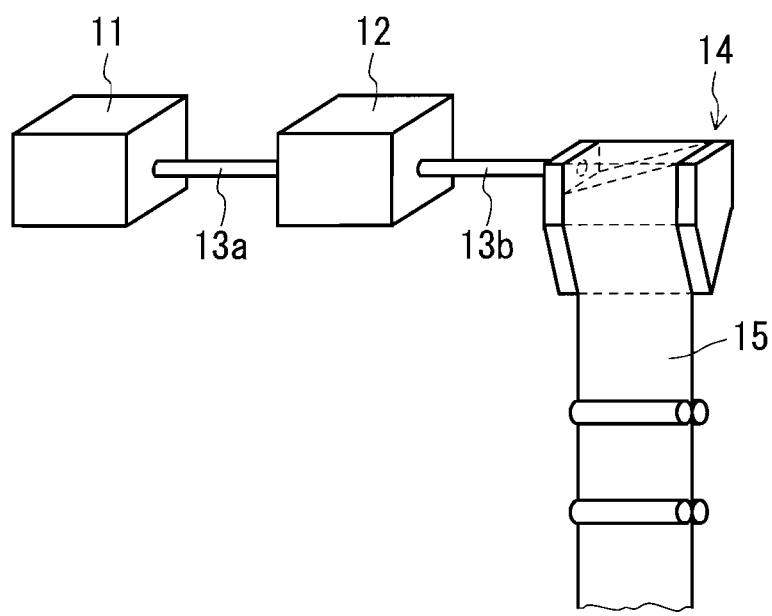
FIG. 8 is a schematic diagram for explaining a method of producing a glass substrate of the present invention.

In the production method of the present invention, the melt of the glass composition of the present invention is formed into a glass substrate for an FPD by a downdraw process. An example of the production method of the present invention is described below with reference to FIG. 8.

First, glass raw materials are melted in a melting chamber 11 to form a melt of the glass composition of the present invention. The melt formed in the melting chamber 11 is delivered to a refining chamber 12 through a pipe 13a, and refined in the refining chamber 12. The melt thus refined in the refining chamber 12 is delivered to a downdraw forming apparatus 14 through a pipe 13b. The melt thus delivered to the forming apparatus 14 is allowed to flow over the upper edges of the apparatus 14 and flow downward along the wall surfaces (the front wall surface and the back wall surface in FIG. 7) of the apparatus 14. These wall surfaces meet at the lower end of the apparatus 14, and two streams of the melt flowing downward along the wall surfaces are fused together at the lower end of the apparatus 14. Thus, a single glass ribbon 15 is formed. The glass ribbon 15 thus obtained is cooled, and then cut into pieces of a desired size. Thus, glass substrates for FPDs are obtained.

The details of the production method of the present invention is not limited to any particular ones as long as the melt of the glass composition of the present invention is formed into a glass substrate for an FPD by the downdraw process. The structure of the apparatus used for the production method of the present invention, that of the downdraw forming apparatus in particular, also is not limited to any particular one.

EXAMPLES

Hereinafter, the present invention is described further in detail by way of Examples. The present invention is not limited to the following examples.

(Production Method of Glass Samples)

First, glass raw material batches were prepared so that glass compositions of Examples and Comparative Examples shown in Tables 3 to 7 were obtained from the batches. As the glass raw materials, silica, boracic anhydride, alumina, basic magnesium carbonate, calcium carbonate, strontium carbonate, potassium carbonate, tin oxide, and iron oxide were used.

Next, each of the raw material batches thus prepared was put into a platinum crucible and allowed to stand for 2 hours in an electric furnace at a setting temperature of 1550° C., and then allowed to stand for another 2 hours in the electric furnace at a setting temperature of 1620° C. Thus, molten glass was obtained. Next, the molten glass thus obtained was poured on an iron plate to obtain a glass block. The glass block was placed in an electric furnace set at 750° C., and allowed to stand for 30 minutes, followed by cooling to 550° C. for 2 hours. Then, the electric furnace, in which the glass block was placed, was turned off so that the glass block was cooled to room temperature. Thus, a glass sample was obtained.

The evaluation method of the glass sample is shown below.

(Devitrification Temperature)

The devitrification temperature of the glass sample was measured in the following manner. First, the glass sample was ground in a mortar to obtain glass particles. The glass particles were subjected to sieving, and particles that passed through a sieve with a 2380 μm mesh size but did not pass through a sieve with a 1000 μm mesh size were gathered. Next, the gathered glass particles were cleaned ultrasonically in ethanol, and dried. Thus, a measurement sample was obtained. Next, 25 g of the measurement sample thus obtained was placed in a platinum boat of 12 mm in width and 200 mm in length. The platinum boat was placed in a gradient heating furnace and allowed to stand for 24 hours. Next, the platinum boat containing the glass was taken out of the furnace and cooled to room temperature. Then, crystals formed in the glass (devitrification) were observed with an optical microscope. This experiment was carried out in various ranges of measurement temperatures of the furnace, and the highest temperature at which crystals were observed was defined as the devitrification temperature of the glass sample.

(Linear Thermal Expansion Coefficient)

The linear thermal expansion coefficient of the glass sample was measured in the following manner. First, the glass sample was worked into a cylindrical shape of 5 mm in diameter and 20 mm in length. Next, the cylindrical glass sample thus formed was subjected to thermomechanical analysis (TMA) using a thermomechanical analyzer (Thermo Plus II TMA8310, manufactured by Rigaku Corporation). In this TMA, the increase in the expansion of the glass sample was measured based on the size of the sample at a reference temperature of 50° C., and the linear thermal expansion coefficient thereof was calculated from the measured increase in the expansion. The TMA was performed at a heating rate of 5° C./min.

(Glass Transition Temperature: Tg)

The Tg of the glass sample was obtained based on a TMA curve obtained to evaluate the linear thermal expansion coefficient. In this TMA curve, the temperature was plotted on the horizontal axis and the increase in the expansion of the glass sample was plotted on the vertical axis. Specifically, the Tg was obtained in the following manner. First, the TMA curve was observed from the low-temperature side to the high-temperature side. An inflection point on the TMA curve between a point where the constant rate of expansion turned into an increasing rate and a yield point where the glass sample began to contract was obtained based on the differential curve of the TMA curve. Next, two tangents were drawn at the inflection point on the TMA curve and at the point of a temperature lower by 200° C. than the temperature at the inflection point on the TMA curve. Then, the temperature at the point of intersection of these two tangents was defined as the Tg of the glass sample.

(Strain Point)

The strain point of the glass sample was measured according to JIS R3103-2 Appendix (ISO 7884-7) with a beam-bending viscometer.

TABLE 3

| Component (mass %) | Example 1 | Example 2 | Example 3 | Example 4 | Example 5 | Example 6 |
|---|---|---|---|---|---|---|
| $SiO_2$ | 59.4 | 60.4 | 55.5 | 61.0 | 61.5 | 58.8 |
| $B_2O_3$ | 5.8 | 8.9 | 9.2 | 8.0 | 4.0 | 9.3 |
| $Al_2O_3$ | 19.2 | 19.5 | 19.5 | 19.7 | 19.9 | 15.7 |
| MgO | 3.9 | 4.0 | 3.7 | 4.0 | 4.1 | 3.8 |
| CaO | 1.3 | 6.7 | 0.0 | 6.8 | 3.2 | 0.0 |

TABLE 3-continued

| Component (mass %) | Example 1 | Example 2 | Example 3 | Example 4 | Example 5 | Example 6 |
|---|---|---|---|---|---|---|
| SrO | 9.8 | 0.0 | 11.6 | 0.0 | 6.8 | 11.8 |
| $K_2O$ | 0.25 | 0.25 | 0.24 | 0.26 | 0.26 | 0.24 |
| $SnO_2$ | 0.21 | 0.21 | 0.20 | 0.22 | 0.22 | 0.20 |
| $Fe_2O_3$ | 0.08 | 0.08 | 0.08 | 0.08 | 0.08 | 0.08 |
| Total content of ROs | 15.1 | 10.7 | 15.4 | 10.8 | 14.1 | 15.6 |
| MgO/RO total | 0.26 | 0.37 | 0.24 | 0.37 | 0.29 | 0.24 |
| CaO/RO total | 0.09 | 0.63 | 0.00 | 0.63 | 0.23 | 0.00 |
| SrO/RO total | 0.65 | 0.00 | 0.76 | 0.00 | 0.48 | 0.76 |
| Strain point (° C.) | — | — | — | — | — | — |
| Tg (° C.) | 736 | 726 | 736 | 729 | 748 | 719 |
| Thermal expansion coefficient ($\times 10^{-7}/$° C.) | 37.5 | 33.7 | 37.7 | 33.5 | 34.9 | 37.5 |
| Devitrification temperature (° C.) | 1163 | 1169 | 1184 | 1188 | 1192 | 1200 |

TABLE 4

| Component (mass %) | Example 7 | Example 8 | Example 9 | Example 10 | Example 11 | Example 12 | Example 13 | Example 14 | Example 15 | Example 16 |
|---|---|---|---|---|---|---|---|---|---|---|
| $SiO_2$ | 58.4 | 58.4 | 56.6 | 56.6 | 58.3 | 59.2 | 58.1 | 58.3 | 58.4 | 57.1 |
| $B_2O_3$ | 7.4 | 7.6 | 9.2 | 9.2 | 7.6 | 7.7 | 7.6 | 7.6 | 7.4 | 8.4 |
| $Al_2O_3$ | 18.8 | 18.8 | 18.3 | 18.3 | 18.8 | 18.2 | 18.8 | 18.8 | 18.8 | 18.4 |
| MgO | 3.7 | 3.8 | 3.7 | 3.7 | 3.8 | 3.7 | 3.8 | 3.8 | 3.8 | 3.8 |
| CaO | 1.6 | 1.5 | 0.0 | 0.0 | 1.3 | 1.3 | 1.0 | 1.3 | 1.3 | 0.0 |
| SrO | 9.5 | 9.2 | 11.7 | 11.7 | 9.7 | 9.4 | 10.2 | 9.7 | 9.7 | 11.8 |
| $K_2O$ | 0.24 | 0.25 | 0.24 | 0.24 | 0.24 | 0.24 | 0.24 | 0.24 | 0.24 | 0.24 |
| $SnO_2$ | 0.21 | 0.21 | 0.20 | 0.20 | 0.21 | 0.20 | 0.21 | 0.21 | 0.21 | 0.20 |
| $Fe_2O_3$ | 0.08 | 0.08 | 0.08 | 0.08 | 0.08 | 0.08 | 0.08 | 0.08 | 0.08 | 0.08 |
| Total content of ROs | 14.8 | 14.6 | 15.4 | 15.4 | 14.8 | 14.4 | 15.0 | 14.8 | 14.8 | 15.6 |
| MgO/RO total | 0.25 | 0.26 | 0.24 | 0.24 | 0.26 | 0.26 | 0.25 | 0.26 | 0.26 | 0.24 |
| CaO/RO total | 0.11 | 0.11 | 0.00 | 0.00 | 0.09 | 0.09 | 0.07 | 0.09 | 0.09 | 0.00 |
| SrO/RO total | 0.64 | 0.63 | 0.76 | 0.76 | 0.65 | 0.65 | 0.68 | 0.65 | 0.65 | 0.76 |
| Strain point (° C.) | — | — | — | — | — | — | — | — | 688 | — |
| Tg (° C.) | 746 | 734 | 727 | 727 | 734 | 734 | 735 | 736 | 735 | 729 |
| Thermal expansion coefficient ($\times 10^{-7}/$° C.) | 34.1 | 36.2 | 37.7 | 37.7 | 36.3 | 35.8 | 36.5 | 36.8 | 36.9 | 37.0 |
| Devitrification temperature (° C.) | 1131 | 1132 | 1132 | 1132 | 1137 | 1141 | 1142 | 1142 | 1143 | 1146 |

TABLE 5

| Component (mass %) | Example 17 | Example 18 | Example 19 | Example 20 | Example 21 | Example 22 | Example 23 | Example 24 | Example 25 | Example 26 |
|---|---|---|---|---|---|---|---|---|---|---|
| $SiO_2$ | 59.4 | 58.8 | 58.3 | 59.8 | 59.2 | 59.2 | 57.3 | 57.7 | 56.6 | 58.3 |
| $B_2O_3$ | 9.7 | 7.7 | 9.5 | 9.8 | 9.3 | 9.7 | 9.4 | 9.4 | 9.2 | 9.5 |
| $Al_2O_3$ | 19.2 | 19.0 | 18.8 | 19.3 | 16.5 | 19.1 | 18.5 | 18.6 | 18.8 | 18.8 |
| MgO | 3.9 | 3.9 | 3.2 | 3.9 | 3.8 | 3.2 | 3.8 | 4.8 | 3.2 | 3.2 |
| CaO | 5.9 | 2.3 | 4.9 | 6.7 | 1.3 | 6.8 | 1.3 | 0.3 | 0.3 | 4.4 |
| SrO | 1.5 | 7.9 | 4.7 | 0.0 | 9.4 | 1.4 | 9.5 | 8.7 | 11.4 | 5.2 |
| $K_2O$ | 0.25 | 0.25 | 0.24 | 0.25 | 0.24 | 0.25 | 0.00 | 0.24 | 0.24 | 0.24 |
| $SnO_2$ | 0.21 | 0.21 | 0.21 | 0.21 | 0.20 | 0.21 | 0.20 | 0.20 | 0.20 | 0.21 |
| $Fe_2O_3$ | 0.08 | 0.08 | 0.08 | 0.08 | 0.08 | 0.08 | 0.08 | 0.08 | 0.08 | 0.08 |
| Total content of ROs | 11.2 | 14.1 | 12.8 | 10.6 | 14.5 | 11.5 | 14.6 | 13.8 | 14.9 | 12.8 |
| MgO/RO total | 0.35 | 0.28 | 0.25 | 0.37 | 0.26 | 0.28 | 0.26 | 0.35 | 0.22 | 0.25 |
| CaO/RO total | 0.52 | 0.16 | 0.39 | 0.63 | 0.09 | 0.59 | 0.09 | 0.02 | 0.02 | 0.35 |
| SrO/RO total | 0.13 | 0.56 | 0.37 | 0.00 | 0.65 | 0.13 | 0.65 | 0.63 | 0.76 | 0.41 |
| Strain point (° C.) | — | — | — | — | — | — | — | — | — | — |
| Tg (° C.) | 722 | 730 | 720 | 722 | 714 | 718 | 722 | 731 | 729 | 719 |
| Thermal expansion coefficient ($\times 10^{-7}/$° C.) | 33.8 | 35.7 | 35.6 | 33.4 | 36.1 | 34.8 | 35.0 | 35.3 | 37.6 | 35.8 |
| Devitrification temperature (° C.) | 1146 | 1153 | 1156 | 1156 | 1148 | 1138 | 1143 | 1159 | 1145 | 1140 |

TABLE 6

| Component (mass %) | Ex. 27 | Ex. 28 | Ex. 29 | Ex. 30 | Ex. 31 | Ex. 32 | Ex. 33 | Ex. 34 | Ex. 35 | Ex. 36 | Ex. 37 | Ex. 38 |
|---|---|---|---|---|---|---|---|---|---|---|---|---|
| $SiO_2$ | 57.5 | 57.6 | 57.7 | 57.8 | 57.5 | 57.3 | 56.7 | 56.8 | 56.9 | 57.0 | 57.1 | 57.2 |
| $B_2O_3$ | 8.4 | 8.5 | 8.5 | 8.5 | 8.8 | 9.3 | 9.2 | 9.3 | 9.3 | 9.3 | 9.3 | 9.3 |
| $Al_2O_3$ | 18.5 | 18.6 | 18.6 | 18.7 | 18.6 | 18.5 | 18.3 | 18.3 | 18.4 | 18.4 | 18.4 | 18.4 |
| MgO | 3.8 | 3.8 | 3.8 | 3.8 | 3.8 | 3.8 | 3.7 | 3.7 | 3.8 | 3.8 | 3.8 | 3.8 |
| CaO | 0.8 | 1.0 | 1.3 | 1.5 | 1.3 | 1.3 | 0.2 | 0.4 | 0.7 | 1.0 | 1.1 | 1.3 |
| SrO | 10.5 | 10.1 | 9.6 | 9.2 | 9.5 | 9.5 | 11.3 | 10.9 | 10.4 | 10.0 | 9.7 | 9.5 |
| $K_2O$ | 0.24 | 0.24 | 0.24 | 0.24 | 0.24 | 0.10 | 0.24 | 0.24 | 0.24 | 0.24 | 0.24 | 0.24 |
| $SnO_2$ | 0.20 | 0.20 | 0.20 | 0.20 | 0.20 | 0.20 | 0.20 | 0.20 | 0.20 | 0.20 | 0.20 | 0.20 |
| $Fe_2O_3$ | 0.08 | 0.08 | 0.08 | 0.08 | 0.08 | 0.08 | 0.08 | 0.08 | 0.08 | 0.08 | 0.08 | 0.08 |
| Total content of ROs | 15.0 | 14.9 | 14.7 | 14.5 | 14.6 | 14.5 | 15.3 | 15.1 | 14.9 | 14.7 | 14.6 | 14.5 |
| MgO/RO total | 0.25 | 0.25 | 0.26 | 0.26 | 0.26 | 0.26 | 0.24 | 0.25 | 0.25 | 0.25 | 0.26 | 0.26 |
| CaO/RO total | 0.05 | 0.07 | 0.09 | 0.10 | 0.09 | 0.09 | 0.01 | 0.03 | 0.05 | 0.07 | 0.08 | 0.09 |
| SrO/RO total | 0.70 | 0.68 | 0.65 | 0.63 | 0.65 | 0.65 | 0.74 | 0.72 | 0.70 | 0.68 | 0.67 | 0.65 |
| Strain point (° C.) | — | — | — | — | — | — | — | — | — | — | — | 675 |
| Tg (° C.) | 728 | 728 | 728 | 728 | 727 | 724 | 727 | 726 | 725 | 726 | 726 | 724 |
| Thermal expansion coefficient ($\times 10^{-7}$/° C.) | 36.8 | 36.8 | 36.5 | 36.4 | 36.4 | 35.8 | 37.5 | 37.4 | 37.4 | 37.0 | 36.9 | 36.2 |
| Devitrification temperature (° C.) | 1119 | 1120 | 1123 | 1126 | 1107 | 1127 | 1120 | 1111 | 1106 | 1095 | 1092 | 1099 |

| Component (mass %) | Ex. 39 | Ex. 40 | Ex. 41 | Ex. 42 | Ex. 43 | Ex. 44 | Ex. 45 | Ex. 46 | Ex. 47 |
|---|---|---|---|---|---|---|---|---|---|
| $SiO_2$ | 56.8 | 57.9 | 57.3 | 57.5 | 58.2 | 58.4 | 58.2 | 56.7 | 57.0 |
| $B_2O_3$ | 9.3 | 9.4 | 9.3 | 9.4 | 8.5 | 9.5 | 9.3 | 9.3 | 9.3 |
| $Al_2O_3$ | 18.3 | 18.7 | 18.5 | 18.5 | 18.8 | 18.8 | 17.5 | 18.3 | 18.4 |
| MgO | 3.1 | 3.1 | 3.8 | 3.8 | 3.8 | 3.8 | 3.8 | 3.7 | 3.8 |
| CaO | 1.7 | 4.0 | 1.5 | 1.9 | 2.3 | 3.8 | 1.3 | 1.3 | 1.3 |
| SrO | 10.3 | 6.4 | 9.1 | 8.4 | 7.8 | 5.0 | 9.5 | 9.4 | 9.5 |
| $K_2O$ | 0.24 | 0.24 | 0.24 | 0.24 | 0.24 | 0.24 | 0.24 | 1.00 | 0.50 |
| $SnO_2$ | 0.20 | 0.20 | 0.20 | 0.20 | 0.21 | 0.21 | 0.20 | 0.20 | 0.20 |
| $Fe_2O_3$ | 0.08 | 0.08 | 0.08 | 0.08 | 0.08 | 0.08 | 0.08 | 0.08 | 0.08 |
| Total content of ROs | 15.1 | 13.5 | 14.4 | 14.1 | 13.9 | 12.7 | 14.5 | 14.4 | 14.5 |
| MgO/RO total | 0.20 | 0.23 | 0.26 | 0.27 | 0.28 | 0.30 | 0.26 | 0.26 | 0.26 |
| CaO/RO total | 0.11 | 0.30 | 0.10 | 0.13 | 0.16 | 0.30 | 0.09 | 0.09 | 0.09 |
| SrO/RO total | 0.68 | 0.47 | 0.63 | 0.60 | 0.56 | 0.40 | 0.65 | 0.65 | 0.65 |
| Strain point (° C.) | — | — | — | — | — | — | — | — | — |
| Tg (° C.) | 728 | 722 | 726 | 725 | 728 | 724 | 717 | 713 | 717 |
| Thermal expansion coefficient ($\times 10^{-7}$/° C.) | 36.7 | 35.9 | 36.7 | 36.4 | 36.0 | 35.2 | 36.3 | 37.9 | 36.2 |
| Devitrification temperature (° C.) | 1123 | 1126 | 1087 | 1093 | 1116 | 1117 | 1103 | 1107 | 1106 |

TABLE 7

| Component (mass %) | Com. Example 1 | Com. Example 2 | Com. Example 3 | Com. Example 4 | Com. Example 5 | Com. Example 6 | Com. Example 7 | Com. Example 8 | Com. Example 9 | Com. Example 10 | Com. Example 11 |
|---|---|---|---|---|---|---|---|---|---|---|---|
| $SiO_2$ | 57.7 | 55.1 | 58.8 | 60.6 | 55.8 | 60.3 | 56.6 | 59.3 | 56.9 | 54.8 | 61.0 |
| $B_2O_3$ | 9.4 | 9.0 | 7.7 | 4.0 | 9.1 | 3.9 | 11.1 | 9.7 | 7.4 | 8.9 | 12.0 |
| $Al_2O_3$ | 18.6 | 17.8 | 19.0 | 19.5 | 18.0 | 19.5 | 18.3 | 19.1 | 18.4 | 17.7 | 16.0 |
| MgO | 5.1 | 2.0 | 5.2 | 4.0 | 2.9 | 4.0 | 5.0 | 6.9 | 2.9 | 1.6 | 1.0 |
| CaO | 0.0 | 0.0 | 0.0 | 1.4 | 0.0 | 0.8 | 0.0 | 0.0 | 0.0 | 0.0 | 5.0 |
| SrO | 8.7 | 15.6 | 8.9 | 10.0 | 13.7 | 11.0 | 8.5 | 4.5 | 13.9 | 16.5 | 2.0 |
| BaO | 0.0 | 0.0 | 0.0 | 0.0 | 0.0 | 0.0 | 0.0 | 0.0 | 0.0 | 0.0 | 2.0 |
| $K_2O$ | 0.24 | 0.23 | 0.25 | 0.25 | 0.23 | 0.25 | 0.24 | 0.25 | 0.24 | 0.23 | 0.00 |
| $SnO_2$ | 0.20 | 0.19 | 0.21 | 0.21 | 0.20 | 0.21 | 0.20 | 0.21 | 0.20 | 0.19 | 0.00 |
| $Fe_2O_3$ | 0.08 | 0.07 | 0.08 | 0.08 | 0.08 | 0.08 | 0.08 | 0.08 | 0.08 | 0.07 | 0.00 |
| $As_2O_3$ | 0.00 | 0.00 | 0.00 | 0.00 | 0.00 | 0.00 | 0.00 | 0.00 | 0.00 | 0.00 | 1.00 |
| Total content of ROs | 13.8 | 17.6 | 14.0 | 15.4 | 16.5 | 15.8 | 13.5 | 11.4 | 16.8 | 18.1 | 8.0 |
| MgO/RO total | 0.37 | 0.11 | 0.37 | 0.26 | 0.17 | 0.25 | 0.37 | 0.61 | 0.17 | 0.09 | 0.13 |
| CaO/RO total | 0.00 | 0.00 | 0.00 | 0.09 | 0.00 | 0.05 | 0.00 | 0.00 | 0.00 | 0.00 | 0.63 |
| SrO/RO total | 0.63 | 0.89 | 0.63 | 0.65 | 0.83 | 0.70 | 0.63 | 0.39 | 0.83 | 0.91 | 0.25 |
| Strain point (° C.) | — | — | — | — | — | — | — | — | — | — | 654 |
| Tg (° C.) | 732 | 724 | 745 | 764 | 726 | 753 | 719 | 734 | 733 | 724 | 708 |

TABLE 7-continued

| Component (mass %) | Com. Example 1 | Com. Example 2 | Com. Example 3 | Com. Example 4 | Com. Example 5 | Com. Example 6 | Com. Example 7 | Com. Example 8 | Com. Example 9 | Com. Example 10 | Com. Example 11 |
|---|---|---|---|---|---|---|---|---|---|---|---|
| Thermal expansion coefficient ($\times 10^{-7}/°C.$) | 35.1 | 41.2 | 35.4 | 38.2 | 39.5 | 35.4 | 36.1 | 31.3 | 38.2 | 42.1 | 34.0 |
| Devitrification temperature (°C.) | 1202 | 1205 | 1213 | 1219 | 1222 | 1223 | 1260 | 1287 | 1327 | 1358 | 1121 |

Industrial Applicability

The glass composition of the present invention is suitable for a glass substrate for an FPD such as an LCD. The glass composition of the present invention is suitable as a glass substrate for an LCD, in particular, as a glass substrate used for a polysilicon (p-Si) LCD on which a TFT circuit is formed at a temperature ranging from 500 to 600° C.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass composition comprising, in terms of mass %:
54 to 62% of $SiO_2$;
4 to 11% of $B_2O_3$;
15 to 20% of $Al_2O_3$;
2 to 5% of MgO;
0 to 4.255% of CaO;
0 to 13.5% of SrO;
0 to 1% of $K_2O$;
0.1 to 1% of $SnO_2$; and
0.05 to 0.2% of $Fe_2O_3$, wherein
the glass composition is substantially free of BaO,
a total content of alkaline earth metal oxides (MgO+CaO+SrO) is 10 to 18.5 mass %,
a mass ratio of the content of CaO to the total content of the alkaline earth metal oxides is 0.23 or lower, and
a devitrification temperature of the glass composition is 1200° C. or lower.

2. The glass composition according to claim 1, wherein the mass ratio of the content of CaO to the total content of the alkaline earth metal oxides is 0.05 to 0.23.

3. The glass composition according to claim 1, wherein a glass transition point of the glass composition is 720° C. or higher.

4. The glass composition of claim 1, wherein the content of SrO is 5% or more.

5. A glass substrate for a flat panel display, the substrate being composed of the glass composition according to claim 1.

6. A flat panel display comprising the glass substrate for a flat panel display according to claim 5.

7. A glass composition comprising, in terms of mass %:
54 to 62% of $SiO_2$;
4 to 11% of $B_2O_3$;
15 to 20% of $Al_2O_3$;
2 to 5% of MgO;
0 to 4.255% of CaO;
0 to 13.5% of SrO;
0 to 1% of $K_2O$;
0 to 1% of $SnO_2$; and
0 to 0.2% of $Fe_2O_3$, wherein
the glass composition is substantially free of BaO,
a total content of alkaline earth metal oxides (MgO+CaO+SrO) is 10 to 18.5 mass %,
a mass ratio of the content of CaO to the total content of the alkaline earth metal oxides is 0.23 or lower
a mass ratio of the content of MgO to the total content of the alkaline earth metal oxides is 0.2 to 0.3, and
a devitrification temperature of the glass composition is 1200° C. or lower.

8. The glass composition according to claim 7, wherein the mass ratio of the content of CaO to the total content of the alkaline earth metal oxides is 0.05 to 0.23.

9. The glass composition according to claim 7, wherein a glass transition point of the glass composition is 720° C. or higher.

10. The glass composition of claim 7, wherein the content of SrO is 5% or more.

11. A glass substrate for a flat panel display, the substrate being composed of the glass composition according to claim 7.

12. A flat panel display comprising the glass substrate for a flat panel display according to claim 11.

13. A glass composition comprising, in terms of mass %:
54 to 62% of $SiO_2$;
4 to 11% of $B_2O_3$;
15 to 20% of $Al_2O_3$;
2 to 5% of MgO;
0 to 4.255% of CaO;
0 to 13.5% of SrO;
0 to 1% of $K_2O$;
0 to 1% of $SnO_2$; and
0 to 0.2% of $Fe_2O_3$, wherein
the glass composition is substantially free of BaO,
a total content of alkaline earth metal oxides (MgO+CaO+SrO) is 10 to 18.5 mass %,
a mass ratio of the content of CaO to the total content of the alkaline earth metal oxides is 0.23 or lower, and
a devitrification temperature of the glass composition is 1200° C. or lower.

14. The glass composition according to claim 13, wherein the mass ratio of the content of CaO to the total content of the alkaline earth metal oxides is 0.05 to 0.23.

15. The glass composition according to claim 13, wherein a glass transition point of the glass composition is 720° C. or higher.

16. The glass composition of claim 13, wherein the content of SrO is 5% or more.

17. A glass substrate for a flat panel display, the substrate being composed of the glass composition according to claim 13.

18. A flat panel display comprising the glass substrate for a flat panel display according to claim 17.

19. A glass composition comprising, in terms of mass %:
54 to 62% of $SiO_2$;
4 to 11% of $B_2O_3$;
15 to 20% of $Al_2O_3$;
2 to 5% of MgO;
0 to 4.255% of CaO;
0 to 13.5% of SrO;
0.1 to 1% of $K_2O$;
0 to 1% of $SnO_2$; and
0 to 0.2% of $Fe_2O_3$, wherein
the glass composition is substantially free of BaO,
a total content of alkaline earth metal oxides (MgO+CaO+SrO) is 10 to 18.5 mass %,
a mass ratio of the content of CaO to the total content of the alkaline earth metal oxides is 0.23 or lower, and
a devitrification temperature of the glass composition is 1200° C. or lower.

20. The glass composition according to claim 19, wherein the mass ratio of the content of CaO to the total content of the alkaline earth metal oxides is 0.05 to 0.23.

21. The glass composition according to claim 19, wherein a glass transition point of the glass composition is 720° C. or higher.

22. The glass composition of claim 19, wherein the content of SrO is 5% or more.

23. A glass substrate for a flat panel display, the substrate being composed of the glass composition according to claim 19.

24. A flat panel display comprising the glass substrate for a flat panel display according to claim 23.

* * * * *